United States Patent
Cheal et al.

(10) Patent No.: US 7,823,914 B2
(45) Date of Patent: Nov. 2, 2010

(54) AIRBAG MOUNTING ASSEMBLY AND METHOD OF MANUFACTURE

(75) Inventors: Blake Cheal, Perry, UT (US); Howard Jackman, Uintah, UT (US)

(73) Assignee: Autoliv ASP, Inc., Ogden, UT (US)

( * ) Notice: Subject to any disclaimer, the term of this patent is extended or adjusted under 35 U.S.C. 154(b) by 296 days.

(21) Appl. No.: 11/803,238

(22) Filed: May 14, 2007

(65) Prior Publication Data
US 2008/0284142 A1 Nov. 20, 2008

(51) Int. Cl.
*B60R 21/213* (2006.01)
(52) U.S. Cl. .................. 280/730.2; 280/728.2
(58) Field of Classification Search .............. 280/730.2, 280/733, 728.2
See application file for complete search history.

(56) References Cited

U.S. PATENT DOCUMENTS

| | | | |
|---|---|---|---|
| 5,746,690 A | 5/1998 | Humbarger et al. | |
| 5,899,486 A | 5/1999 | Ibe | |
| 6,073,961 A | 6/2000 | Bailey et al. | |
| 6,099,026 A | 8/2000 | Ando et al. | |
| 6,209,907 B1 | 4/2001 | Fischer | |
| 6,223,389 B1 | 5/2001 | Walsh et al. | |
| 6,305,707 B1 | 10/2001 | Ishiyama et al. | |
| 6,412,810 B1 | 7/2002 | Wipasuramonton et al. | |
| 6,415,560 B1 | 7/2002 | Rinderer | |
| 6,550,809 B1 | 4/2003 | Masuda et al. | |
| 6,672,612 B2 | 1/2004 | Sauer et al. | |
| 6,705,635 B2 | 3/2004 | Hoeft et al. | |
| 6,743,162 B2 | 6/2004 | Hieber et al. | |
| 6,749,220 B1 | 6/2004 | Wipasuramonton et al. | |
| 6,758,490 B2 | 7/2004 | Hoeft et al. | |
| 6,796,576 B2 | 9/2004 | Aoki et al. | |
| 6,851,702 B2 | 2/2005 | Henderson et al. | |
| 6,889,999 B2 | 5/2005 | Dominissini et al. | |
| 6,991,256 B2 | 1/2006 | Henderson et al. | |
| 7,083,188 B2* | 8/2006 | Henderson et al. | 280/730.2 |
| 7,097,200 B2 | 8/2006 | Wold | |
| 7,121,579 B2 | 10/2006 | Ochiai et al. | |
| 7,125,037 B2 | 10/2006 | Tallerico et al. | |
| 7,159,896 B2* | 1/2007 | Ochiai et al. | 280/730.2 |

(Continued)

FOREIGN PATENT DOCUMENTS

DE   10 2005 012 845   9/2006

(Continued)

OTHER PUBLICATIONS

Notification of Transmittal of the International Search Report and the Written Opinion of the International Searching Authority issued Sep. 4, 2008 in International Application No. PCT/US2008/059648.

(Continued)

*Primary Examiner*—Toan C To
*Assistant Examiner*—Karen Jane J Amores
(74) *Attorney, Agent, or Firm*—Sally J Brown; Stoel Rives LLP

(57) ABSTRACT

An airbag assembly, airbag mounting assembly, and method of assembling an airbag mounting assembly are disclosed. The airbag assembly comprises an airbag and an airbag mounting assembly. In one embodiment, the airbag mounting assembly comprises a mounting bracket, a connecting member, and a wrapping member.

19 Claims, 7 Drawing Sheets

U.S. PATENT DOCUMENTS

| | | | |
|---|---|---|---|
| 7,163,231 | B2 | 1/2007 | Kumagai |
| 7,261,682 | B2 | 8/2007 | Cookston et al. |
| 7,344,154 | B2 | 3/2008 | Yokoyama et al. |
| 7,357,408 | B2 | 4/2008 | Hall et al. |
| 7,407,182 | B2 * | 8/2008 | Aoki et al. ............... 280/730.2 |
| 7,547,038 | B2 | 6/2009 | Coleman |
| 7,641,220 | B2 | 1/2010 | Visker et al. |
| 2002/0158450 | A1 | 10/2002 | Hoeft et al. |
| 2003/0006589 | A1 | 1/2003 | Aoki et al. |
| 2003/0042712 | A1 | 3/2003 | Henderson et al. |
| 2004/0000775 | A1 | 1/2004 | Henderson et al. |
| 2005/0010335 | A1 | 1/2005 | Kettenacker et al. |
| 2005/0029778 | A1 | 2/2005 | Weber et al. |
| 2005/0046154 | A1 * | 3/2005 | Rhea et al. ............... 280/728.2 |
| 2005/0104335 | A1 * | 5/2005 | Henderson et al. ....... 280/728.2 |
| 2005/0110256 | A1 | 5/2005 | Cookston et al. |
| 2005/0206138 | A1 | 9/2005 | Breuninger et al. |
| 2006/0119084 | A1 * | 6/2006 | Coon et al. ............. 280/730.2 |
| 2006/0138762 | A1 | 6/2006 | Jang |
| 2006/0192368 | A1 | 8/2006 | Hall et al. |
| 2006/0197316 | A1 * | 9/2006 | Watanabe ................ 280/728.2 |
| 2006/0237957 | A1 | 10/2006 | Woydick |
| 2007/0003390 | A1 | 1/2007 | Kawai |
| 2007/0024031 | A1 * | 2/2007 | Coleman ................. 280/728.2 |
| 2007/0090630 | A1 * | 4/2007 | Wilmot ................... 280/728.2 |
| 2007/0090634 | A1 | 4/2007 | Jang et al. |
| 2007/0126211 | A1 * | 6/2007 | Moerke et al. ........... 280/728.2 |
| 2007/0216139 | A1 | 9/2007 | Mazanek et al. |
| 2007/0296189 | A1 * | 12/2007 | Berntsson et al. ........ 280/730.2 |
| 2008/0197610 | A1 | 8/2008 | Downey |
| 2008/0217896 | A1 | 9/2008 | Visker et al. |
| 2008/0284142 | A1 * | 11/2008 | Cheal et al. ............. 280/730.2 |

FOREIGN PATENT DOCUMENTS

| | | |
|---|---|---|
| GB | 2309942 | 8/1997 |
| WO | WO 2006/097309 | 9/2006 |
| WO | WO 2007/018650 | 2/2007 |
| WO | WO 2008/109396 | 9/2008 |
| WO | WO 2008/144121 | 11/2008 |

OTHER PUBLICATIONS

Office Action issued Apr. 16, 2007 in U.S. Appl. No. 11/068,662, now U.S. Patent No. 7,357,408.
Amendment and Response to Office Action filed Oct. 16, 2007 in U.S. Appl. No. 11/068,662, now U.S. Patent No. 7,357,408.
Notice of Allowance and Fee(s) Due issued Dec. 4, 2007 in U.S. Appl. No. 11/068,662, now U.S. Patent No. 7,357,408.
Office Action issued Mar. 26, 2008 in U.S. Appl. No. 11/192,258, now U.S. Patent No. 7,547,038.
Response to Requirement for Election filed May 23, 2008 in U.S. Appl. No. 11/192,258, now U.S. Patent No. 7,547,038.
Office Action issued Aug. 8, 2008 in U.S. Appl. No. 11/192,258, now U.S. Patent No. 7,547,038.
Amendment and Response to Office Action filed Nov. 25, 2008 in U.S. Appl. No. 11/192,258, now U.S. Patent No. 7,547,038.
Notice of Non-Compliant Amendment issued Dec. 8, 2008 in U.S. Appl. No. 11/192,258, now U.S. Patent No. 7,547,038.
Interview Summary issued Dec. 9, 2008 in U.S. Appl. No. 11/192,258, now U.S. Patent No. 7,547,038.
Response to Notice of Non-Compliant Amendment filed Dec. 10, 2008 in U.S. Appl. No. 11/192,258, now U.S. Patent No. 7,547,038.
Notice of Allowance and Fee(s) Due issued Dec. 24, 2008 in U.S. Appl. No. 11/192,258, now U.S. Patent No. 7,547,038.
Summary of Interview filed Jan. 5, 2009 in U.S. Appl. No. 11/192,258, now U.S. Patent No. 7,547,038.
Request for Continued Examination filed Jan. 21, 2009 in U.S. Appl. No. 11/192,258, now U.S. Patent No. 7,547,038.
Notice of Allowance and Fee(s) Due issued Feb. 27, 2009 in U.S. Appl. No. 11/192,258, now U.S. Patent No. 7,547,038.
Office Action issued Feb. 24, 2009 in U.S. Appl. No. 11/714,037, now U.S. Patent No. 7,641,220.
Amendment and Response to Office Action issued Aug. 24, 2009 in U.S. Appl. No. 11/714,037, now U.S. Patent No. 7,641,220.
Notice of Allowance and Fee(s) Due issued Sep. 16, 2009 in U.S. Appl. No. 11/714,037, now U.S. Patent No. 7,641,220.
Notification of Transmittal of the International Search Report and the Written Opinion of the International Searching Authority issued May 2, 2006 in International Application No. PCT/US2006/017127.
Notification of Transmittal of the International Search Report and the Written Opinion of the International Searching Authority issued Sep. 29, 2008 in International Application No. PCT/US2008/055420.
Co-pending U.S. Appl. No. 12/555,486, titled Mounting Assemblies With Wrappers for Inflatable Curtain Airbags, filed Sep. 8, 2009.
Co-pending U.S. Appl. No. 12/495,243, titled Airbag Mounting Assemblies With Double-Locking Wrappers, filed Jun. 30, 2009.
Co-pending U.S. Appl. No. 12/689,813, titled Double-Sewn Airbag Mounting Assemblies, filed Jan. 19, 2010.
Co-pending U.S. Appl. No. 12/544,952, titled Inflatable Airbag Assemblies With Alignment Apertures, filed Aug. 20, 2009.
Co-pending U.S. Appl. No. 12/507,699, titled Inflatable Airbag Assemblies With Modular Components and Related Methods of Manufacture, filed Jul. 22, 2009.

* cited by examiner

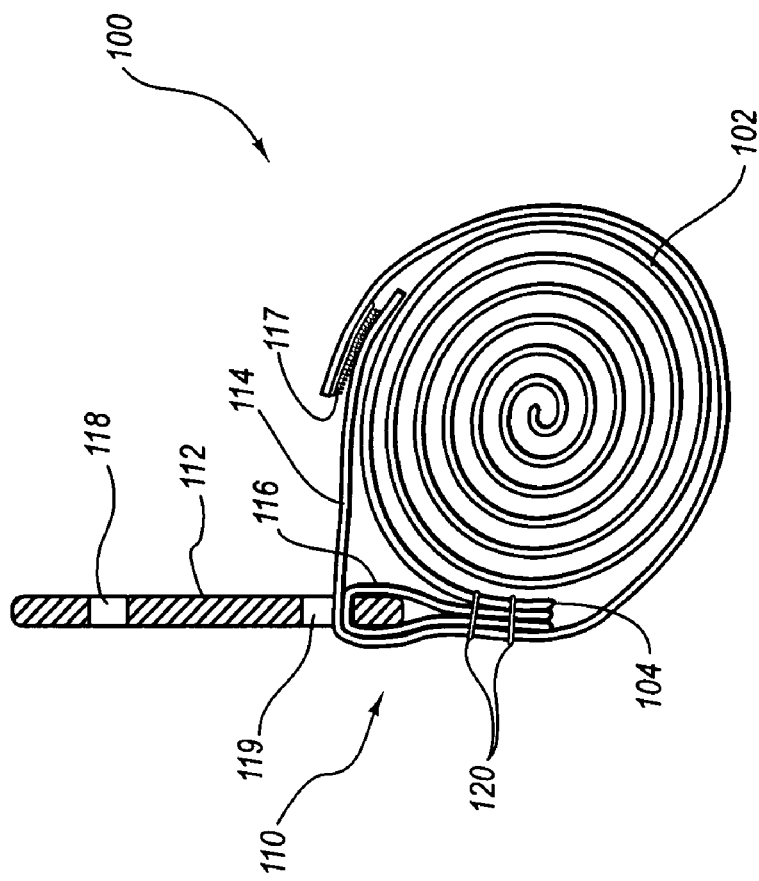
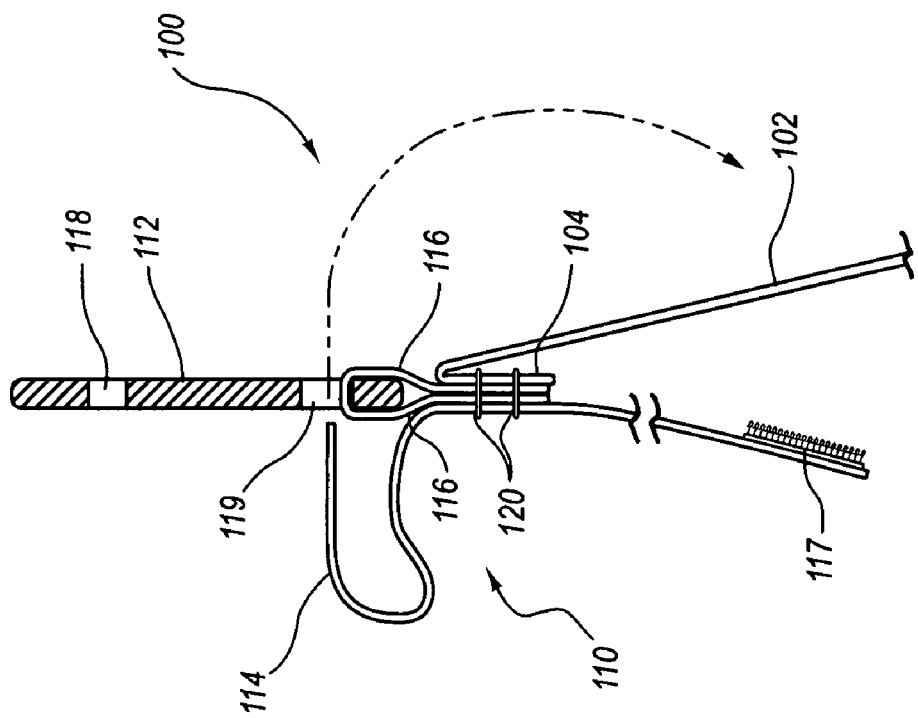

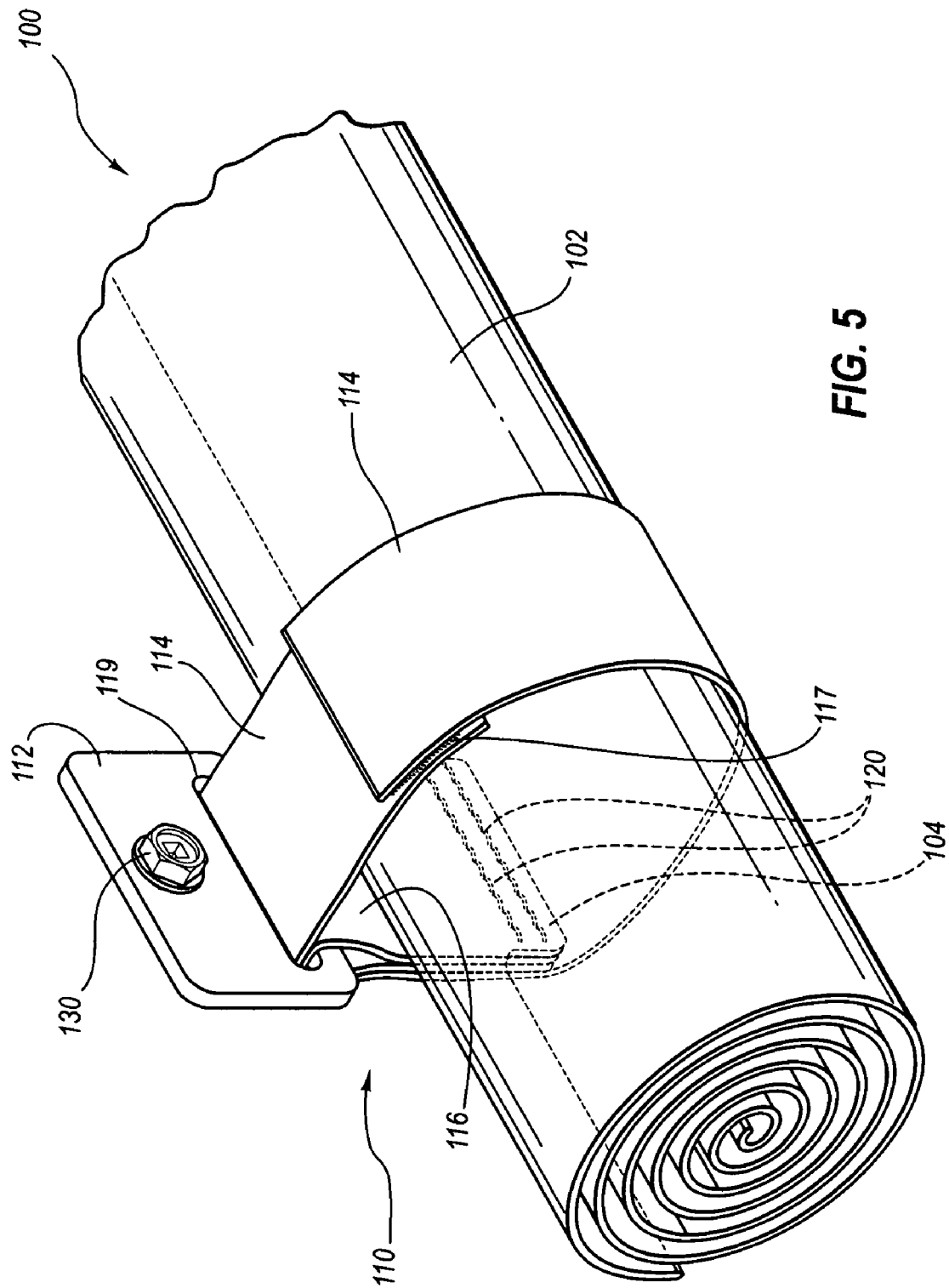

# AIRBAG MOUNTING ASSEMBLY AND METHOD OF MANUFACTURE

TECHNICAL FIELD

The present disclosure relates generally to the field of automotive protection systems. More specifically, the present disclosure relates to airbag mounting systems, such as inflatable airbag mounting systems and the manufacture thereof.

BRIEF DESCRIPTION OF THE DRAWINGS

The present embodiments will become more fully apparent from the following description and claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

FIG. 4A is a side elevation cutaway view depicting the spatial relationships of the components of the airbag assembly of FIG. 1.

FIG. 4B is a side elevation cutaway view of the airbag assembly of FIG. 4A in which a wrapping member of an airbag mounting assembly has been threaded through a mounting bracket and an inflatable curtain airbag is in an undeployed configuration.

FIG. 5 is a perspective view of the airbag assembly of FIG. 4B in which the inflatable curtain airbag is in an undeployed configuration.

Figure 1:
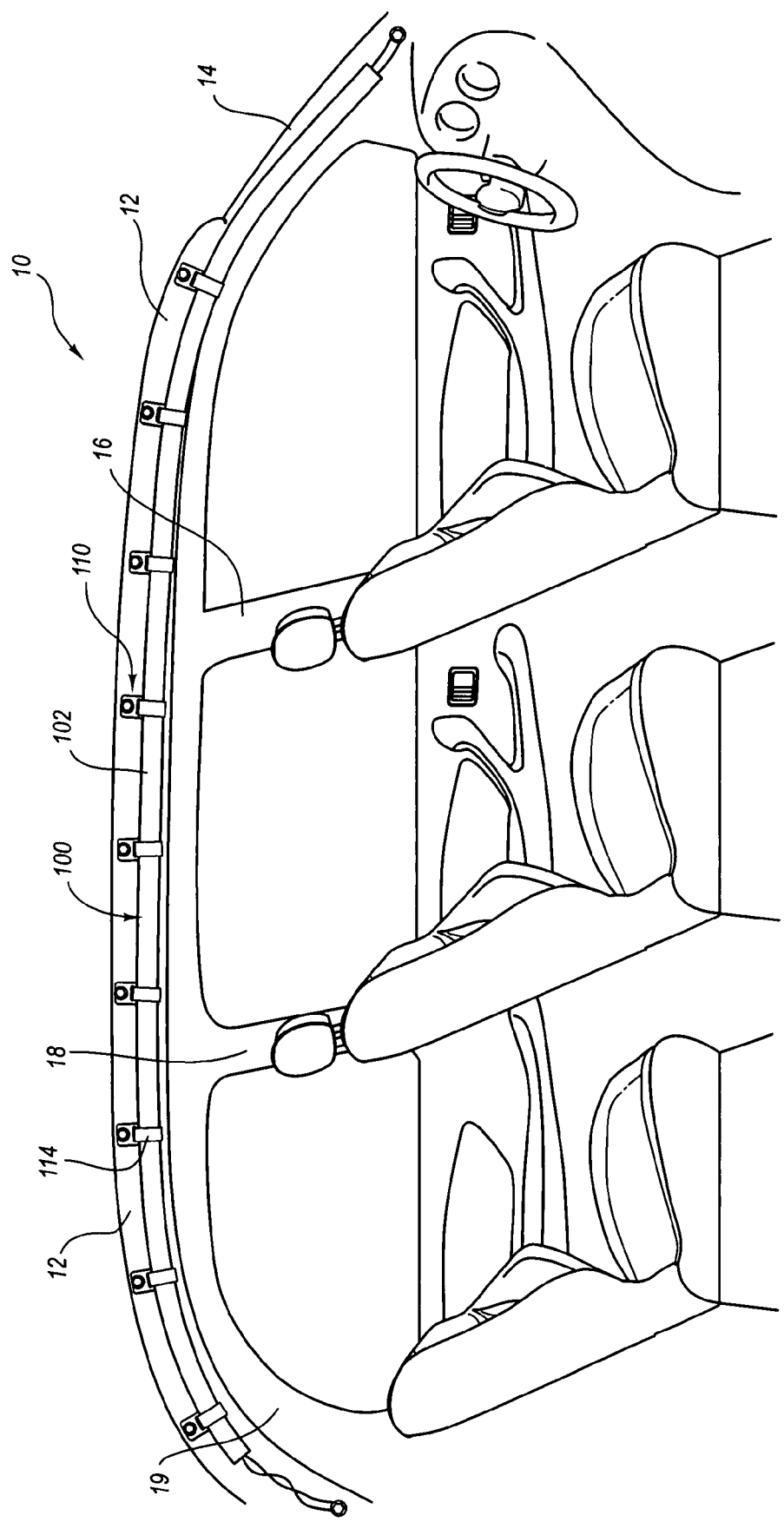
FIG. 1 is a perspective view of an interior of a vehicle showing one embodiment of an airbag assembly wherein an airbag mounting assembly is coupled to an inflatable curtain airbag, which is in an undeployed configuration.

INDEX OF ELEMENTS IDENTIFIED IN THE DRAWINGS 10 vehicle
12 roof rail
14 A-pillar of vehicle
16 B-pillar of vehicle
18 C-pillar of vehicle
19 D-pillar of vehicle
100 airbag assembly
102 inflatable curtain airbag
104 attachment tab
110 airbag mounting assembly
112 mounting bracket
114 wrapping member
116 connecting member
117 closure
118 mounting aperture
119 receiving aperture
120 stitching
130 bolt
600 airbag assembly
602 inflatable curtain airbag
604 attachment tab
610 airbag mounting assembly
612 mounting bracket
615 contiguous wrapping/connecting member
617 closure
618 mounting aperture
619 receiving aperture
620 stitching
700 airbag assembly
702 inflatable curtain airbag
704 attachment tab
710 airbag mounting assembly
712 mounting bracket
714 wrapping member
717 closure
718 mounting aperture
719 receiving aperture
720 stitching

DETAILED DESCRIPTION

It will be readily understood that the components of the embodiments as generally described and illustrated in the figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The phrases "connected to", "coupled to" and "in communication with" refer to any form of interaction between two or more entities, including mechanical, electrical, magnetic, electromagnetic, fluid and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over collision. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of the side windows and the B-pillar of the vehicle. In some embodiments, inflatable curtain airbags may extend from the A-pillar to the C-pillar of the vehicle. In alternative embodiments, inflatable curtain airbags may extend from the A-pillar to the D-pillar of the vehicle.

Inflatable curtain airbags are typically installed adjacent the roof rail of a vehicle in an undeployed state, in which the inflatable curtain airbag is rolled or folded or a combination thereof and retained in the folded or rolled configuration by being wrapped at certain points along the airbag, or alternatively, the airbag maybe retained within a sock. When deployed, the airbag exits the undeployed, folded or rolled state and assumes an extended shape. Thus, an airbag mounting apparatus typically allows for a secure connection between the vehicle and the airbag, yet allows the airbag to change configurations from undeployed/rolled/folded to deployed/extended.

Conventionally, inflatable curtain airbags include attachment tabs at the top edge and at various locations along the longitudinal length of the inflatable curtain airbag. During a conventional installation, bolts or other fasteners are used to attach each attachment tab to the roof rail or similar structure of the vehicle, often with the aid of a mounting bracket.

FIG. 1 depicts one embodiment of an airbag assembly 100 as shown from a perspective view. Airbag assembly 100 comprises an inflatable curtain airbag 102 and an airbag mounting assembly 110. Alternative embodiments, such as front, side, overhead, and knee airbags may be used.

Inflatable curtain airbag 102 of FIG. 1 is mounted inside a vehicle 10 adjacent to roof rail 12. Inflatable curtain airbag 102 includes a mounting surface, which may comprise the top edge of inflatable curtain airbag 102, which is mounted adjacent roof rail 12. Inflatable curtain airbag 102 may extend from A-pillar 14 to D-pillar 19 to provide impact protection for passengers sitting along the side structure of vehicle 10. Alternatively, inflatable curtain airbag 102 may only extend a portion of the distance from A-pillar 14 to D-pillar 19, such as from A-pillar 14 to B-pillar 16 or from A-pillar 14 to C-pillar 18.

Inflatable curtain airbag 102 includes inflatable chambers (not shown), which are in fluid communication with an inflator (not shown). During a collision scenario, the inflator may rapidly inflate inflatable curtain airbag 102, which may adopt an extended/deployed configuration (see FIG. 2).

FIG. 1 depicts inflatable curtain airbag 102 in an undeployed configuration. One embodiment of airbag mounting assembly 110 couples inflatable curtain airbag 102 to roof rail 12. Airbag mounting assembly 110 may comprise mounting bracket 112, a connecting member (not shown), and a wrapping member 114. Mounting bracket 112 may be fastened to roof rail 12 by bolting, welding, gluing, riveting, screwing, or pinning.

FIG. 1 depicts airbag mounting assembly 110 attached adjacent roof rail 12. In other embodiments, airbag mounting assembly 110 may be attached to other structures within a vehicle, such that airbag assembly 110 can be located at various locations within a vehicle, including, but not limited to, the steering wheel, the instrument panel, within the side doors or side seats, in an overhead position, or at the knee or leg position.

Figure 2:
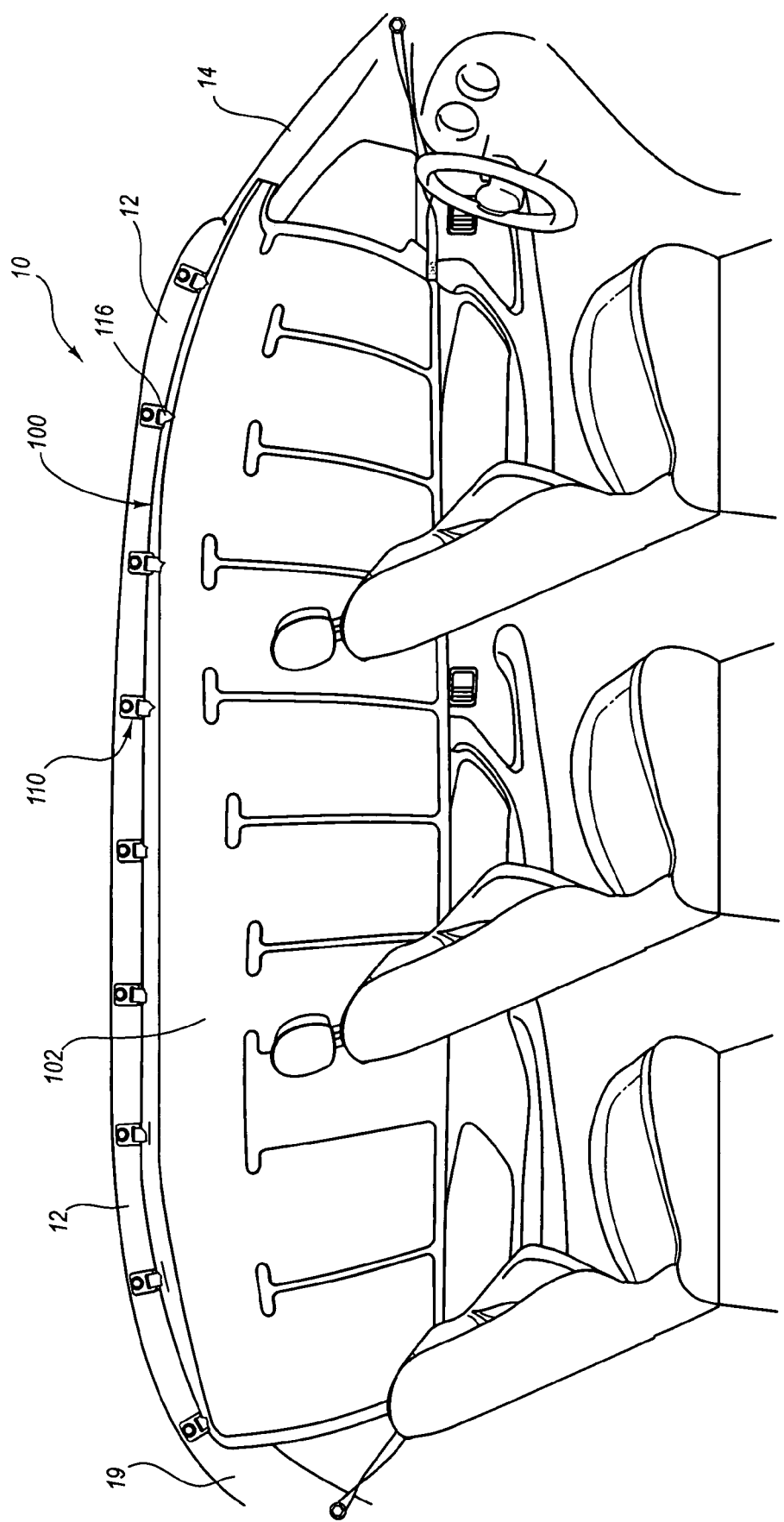
FIG. 2 is a perspective view of an interior of a vehicle showing the airbag assembly of FIG. 1, wherein the inflatable curtain airbag is in a deployed configuration.

FIG. 2 depicts the airbag assembly of FIG. 1 as shown from a perspective view, wherein inflatable curtain airbag 102 is in a deployed or extended configuration. Airbag assembly 100 comprises inflatable curtain airbag 102 and airbag mounting assembly 110. In other embodiments, alternative airbags may be used, such as front, side, overhead, and knee airbags.

Inflatable curtain airbag 102 of FIG. 2 is mounted inside a vehicle 10 adjacent roof rail 12. "Adjacent" the roof rail 12 indicates that inflatable curtain airbag 102 may be mounted directly to roof rail 12 or mounted to some structure at a location proximate to roof rail 12. Inflatable curtain airbag 102 includes a mounting surface, which may comprise the top edge of inflatable curtain airbag 102, which is mounted to roof rail 112. Inflatable curtain airbag 102 may extend from A-pillar 14 to D-pillar 19 to provide impact protection for passengers sitting along the side structure of vehicle 10. Alternatively, inflatable curtain airbag 102 may only extend a portion of the distance from A-pillar 14 to D-pillar 19, such as from A-pillar 14 to B-pillar 16 or from A-pillar 14 to C-pillar 18.

FIG. 2 depicts Inflatable curtain airbag 102 coupled to roof rail 12 by airbag mounting assembly 110, which may comprise mounting bracket 112, connecting member 116, and wrapping member (not shown). Inflatable curtain airbag 102 is coupled to connecting member 116, which is coupled to mounting bracket 112, which is coupled to roof rail 12 of vehicle 10.

Mounting bracket 112 may be attached adjacent roof rail 12 by bolting, welding, gluing, riveting, screwing, pinning, or some other fastening method. FIG. 2 depicts airbag mounting assembly 110 attached adjacent to roof rail 12. Alternatively, airbag mounting assembly 110 may be attached to other structures within a vehicle.

Figure 3:
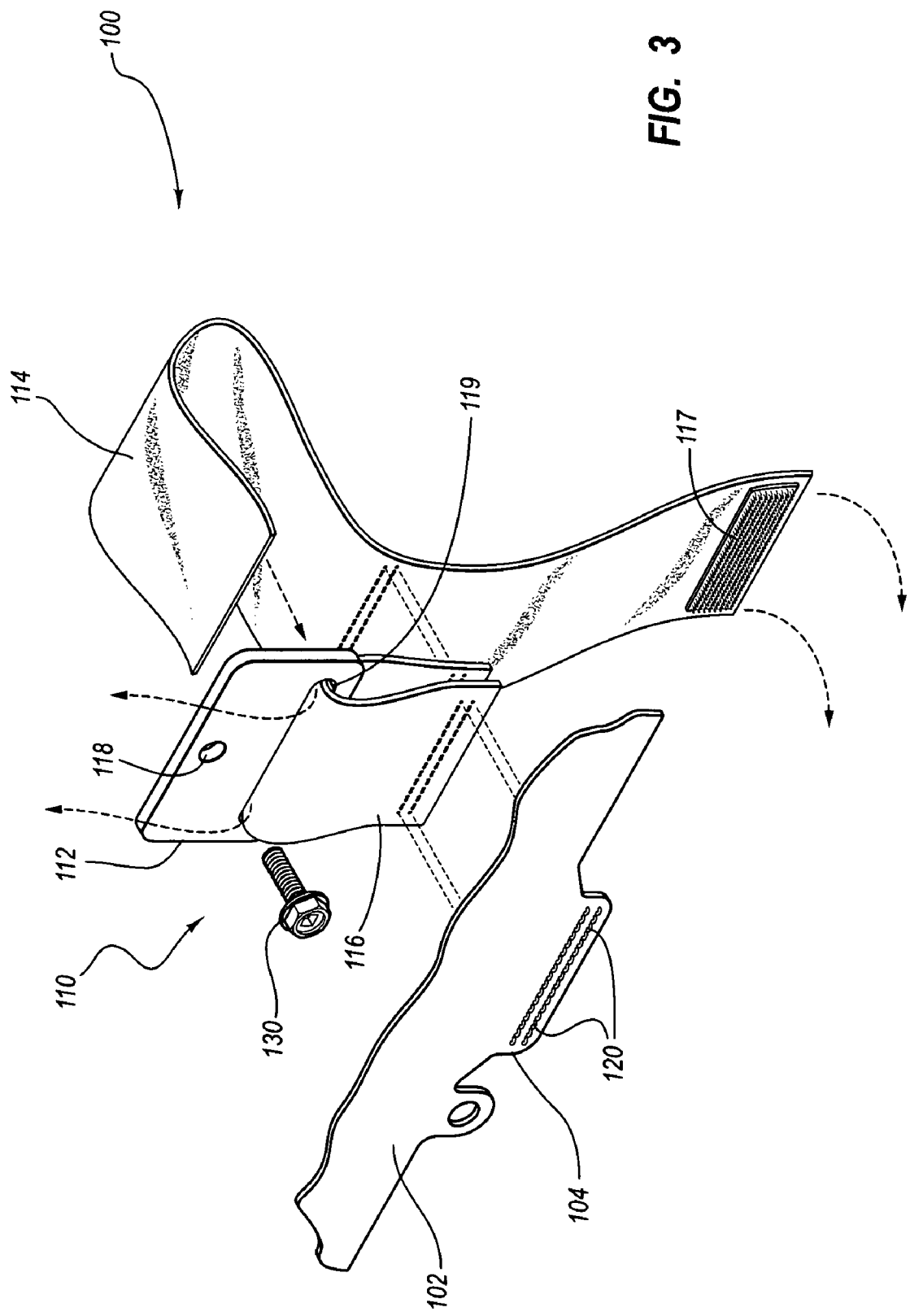
FIG. 3 is an exploded perspective view of the airbag assembly of FIG. 1, wherein the inflatable curtain airbag is partially cut away.

FIG. 3 depicts the airbag assembly 100 and airbag mounting assembly 110 of FIG. 1 from an exploded perspective view. Airbag assembly 100 comprises airbag 102 and airbag mounting assembly 110. Airbag mounting assembly 110 may comprise mounting bracket 112, wrapping member 114, and connecting member 116. In the embodiment of FIG. 3, mounting bracket 112 may comprise a single planar piece, optionally constructed of metal. Mounting bracket 112 may alternatively be constructed of plastic or other suitable materials. Mounting bracket 112 may further comprise a mounting aperture 118 and a receiving aperture 119. Mounting aperture 118 is configured to receive a fastener, such as a bolt 130, which couples the mounting bracket to roof rail 12. FIG. 3 depicts one exemplary embodiment of mounting bracket 112; in other embodiments, mounting bracket 112 may have any acceptable width or shape.

Further, mounting bracket 112 may be coupled to a structure in a vehicle in a manner which precludes the need for mounting aperture 118 (for example, welding or gluing) in which case, mounting bracket 112 may lack mounting aperture 118. Additionally, mounting bracket 112 may be configured with more than one mounting aperture 118, such that more than one fastener may be used to couple mounting bracket 112 to a structure in a vehicle. Fasteners attaching mounting bracket 112 to a structure in a vehicle may include rivets, screws, pins, or some other fastener. In other embodiments, a T-clip or integrated clip may be used to secure mounting assembly 110 into the vehicle in lieu of bolt 130. In yet other embodiments, mounting bracket 112 may include a temp set hook to aid installation of mounting assembly 110 into the vehicle.

In alternative embodiments, mounting bracket 112 may be manufactured from a non-rigid synthetic woven material such as nylon. In the case of this alternative embodiment, mounting bracket 112 may or may not comprise aperture 118.

Receiving aperture 119 is configured to slideably receive wrapping member 114 and connecting member 116. FIG. 3 depicts receiving aperture 119 as elongated, however in alternative embodiments, receiving aperture 119 may be configured in any other shape. In other alternative embodiments, wherein mounting bracket 112 is made from a non-rigid material, wrapping member 114 and connecting member 116 may be coupled to mounting bracket 112 in a manner which precludes the need for receiving aperture 119, such as gluing or sewing wrapping member 114 to the bottom edge of mounting bracket 112. Additionally, in an embodiment in which mounting bracket 112 is made from a synthetic woven material, wrapping member 114 may be split crossectionally into a first wrapping member and a second wrapping member, with first wrapping member and second wrapping member being attached to different sides of mounting bracket 112.

FIG. 3 depicts one embodiment of wrapping member 114, which may comprise a first end portion, a second end portion and an intermediate portion. Additionally a closure 117 may be coupled to wrapping member 114. Wrapping member 114 protrudes through receiving aperture 119 in mounting bracket 112 and may be coupled to attachment tab 104 by a fastener, such as, but not limited to, stitches 120. When the airbag is in an undeployed configuration, wrapping member 114 may envelope a portion of the airbag and be retained in the enveloped conformation by closure 117. Closure 117 may comprise the hooks portion of hooks and loops closures such as those sold under the brand name Velcro; however, in alternative embodiments, closure 117 may comprise tape, adhesive, stitching, staples or any other acceptable closure. Wrapping member 114 may be made from a non-woven frangible material such as those sold under the brand names Cerex or Nolar. Alternatively, wrapping member 114 may comprise plastic film, or non-frangible woven material such as nylon, which may or may not be perforated.

In the depiction of FIG. 3, wrapping member 114 forms a thin rectangular shape; in other embodiments wrapping member may be an alternative shape or size, configured such that wrapping member 114 may still be threaded through receiving aperture 119.

FIG. 3 depicts connecting member 116, which in this embodiment is made from one piece of woven material such as nylon. Connecting member 116 is threaded through receiving aperture 118 such that a loop of material is formed with the free ends oriented away from mounting bracket 112. The free ends of connecting member 116 may be coupled to attachment tab 104. Alternative embodiments of connecting member 116 include those made from a rigid material such as metal or plastic, or from the airbag itself (see FIG. 7).

FIG. 4A depicts the airbag assembly 100 of FIG. 1 from a side elevation view. Airbag assembly 100 may comprise an inflatable curtain airbag 102 and an airbag mounting assembly 110. Airbag mounting assembly 110 may comprise a mounting bracket 112, a wrapping member 114, and a connecting member 116. Mounting bracket 112 is depicted as comprising a mounting aperture 118 and a receiving aperture 119. Wrapping member 114 is configured with a closure 117.

During one exemplary method of manufacture, connecting member 116 is threaded through receiving aperture 119 of mounting bracket 112 and positioned above inflatable curtain airbag 102 such that the free ends of connecting member 116 are adjacent an attachment tab 104 disposed along the top mounting edge of inflatable curtain airbag 102. Wrapping member 114 is positioned above inflatable curtain airbag 102, mounting bracket 112, and connecting member 116 such that it is aligned longitudinally with connecting member 116. In the embodiment depicted, one end of wrapping member 114 protrudes past the ends of connecting member 116 and attachment tab 104. During a single sewing process, stitching 120 is used to couple attachment tab 104, connecting member 116 and wrapping member 114.

Configuring an airbag mounting assembly such that it is possible to use a single manufacturing step, such as sewing to couple inflatable curtain airbag 102, mounting bracket 112, and wrapping member 114 may be desirable in view of conventional assemblies and manufacturing methods known in the art. For example, airbag mounting assembly 100 and the manufacturing process as described above may reduce material cost, labor minutes per unit, and capital costs when compared to other airbag mounting assemblies and manufacturing processes known in the art.

FIG. 4B depicts the airbag assembly of FIG. 4A after an end of wrapping member 114 has been threaded through receiving aperture 119 of mounting bracket 112, such that the end of wrapping member 114 is positioned between inflatable curtain airbag 102 and mounting bracket 112. When inflatable curtain airbag 102 is rolled and/or folded the ends of wrapping member 114 can meet couplably and closure 117 can retain the inflatable curtain airbag 102 in an undeployed configuration.

Alternative orientations of components and orders of execution for manufacturing airbag assembly 100 are possible, and the above description is only one of those possible iterations. For example, inflatable curtain airbag 102 may not comprise attachment tab 104 such that connecting member 116 is coupled to inflatable curtain airbag 102 along the top seam of inflatable curtain airbag 102. Further, wrapping member 114 may be positioned between inflatable curtain airbag 102 and mounting bracket 112/mounting member 116.

FIG. 5 depicts the airbag assembly 100 and airbag mounting assembly 110 of FIG. 4B from a perspective view. In this depiction of airbag assembly 100, inflatable curtain airbag 102 has been configured into an undeployed conformation. The mounting surface of the inflatable curtain airbag is depicted as an attachment tab 104; however, in other embodiments the mounting surface may comprise the top edge of the inflatable curtain airbag 102.

Inflatable curtain airbag 102 is coupled to a vehicle structure via a bolt 130, mounting bracket 112, and connecting member 116, which in this embodiment forms a loop running from adjacent attachment tab 104 through receiving aperture 119 and back to adjacent attachment tab 104. Connecting member 116 is secured to attachment tab 104 by fastener 120, which in this embodiment is stitching.

The distance between the bottom edge of receiving aperture 119 and the top edge of the inflation chamber of airbag 102 may affect inflatable curtain airbag 102 trajectory during deployment. One having skill in the art with the aid of the present disclosure may appreciate that this distance may be altered to optimize inflatable curtain airbag trajectory, depending on the specific application.

Wrapping member 114 is depicted on top of connecting member 116 and is secured to attachment tab 104 by the same fastener 120 used to secure connecting member 116. Wrapping member 114 is depicted as being threaded through receiving aperture 119 such that when inflatable curtain airbag 102 is rolled and/or folded, wrapping member 114 may be wrapped around rolled inflatable curtain airbag 112 and closure 117 engaged such that inflatable curtain airbag 102 is maintained in an undeployed configuration.

In a collision scenario, an airbag inflator (not shown) may inflate airbag 102, causing wrapping member 114 to tear apart, or in another embodiment, cause closure 117 to come apart, thereby allowing inflatable curtain airbag 102 to assume an inflated, extended configuration (as in FIG. 2). In a collision scenario the top edge of inflatable curtain airbag 102 may continue to be coupled to a vehicle structure via mounting bracket 112 and connecting member 116.

Figure 6:
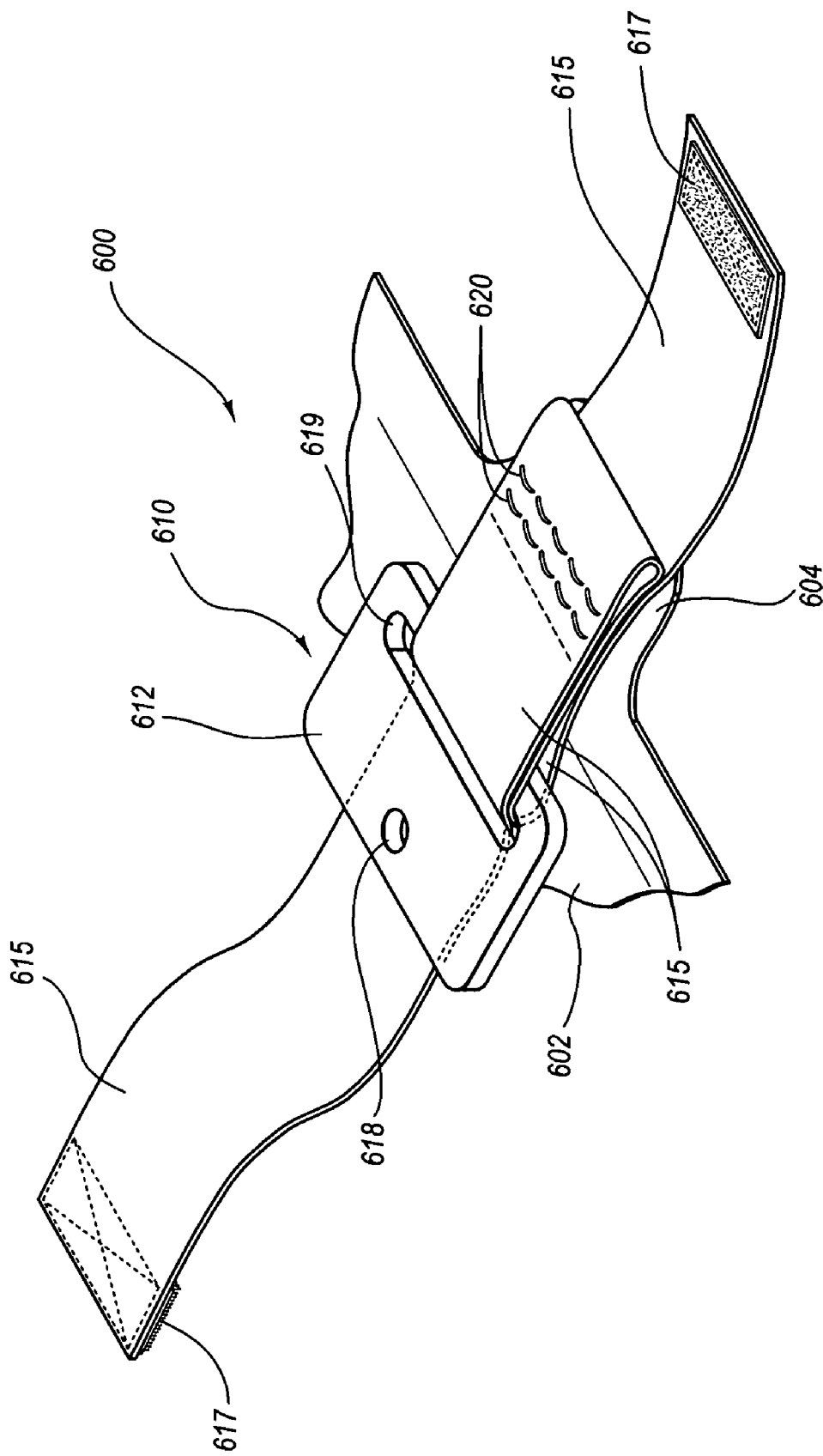
FIG. 6 is a perspective view of one embodiment of an airbag assembly in which an airbag mounting assembly is attached to an airbag that has been partially cutaway and has not yet been configured into an undeployed conformation.

FIG. 6 depicts an alternative embodiment of an airbag assembly 600 from a perspective view. Airbag assembly 600 may comprise an inflatable curtain airbag 602 and an airbag mounting assembly 610. Airbag mounting assembly 610 may comprise a mounting bracket 612 and a contiguous wrapping/ connecting member 615 such that the wrapping member and connecting member depicted in FIG. 5, are formed from one contiguous piece of material. Contiguous wrapping/connecting member 615 may comprise a first end, a second end, and an intermediate portion. Mounting bracket 612 may comprise a mounting aperture 618 and a receiving aperture, 619.

This embodiment may be manufactured by folding the intermediate portion of contiguous wrapping/connecting member 615 and threading the first end of contiguous wrapping/connecting member 615 through receiving aperture 619 of mounting bracket 612 and coupling wrapping/connecting member 615 to an attachment tab 604 using stitches 620. Folding, threading, and fastening of contiguous wrapping/connecting member 615 may be performed such that inflatable curtain airbag 602 is securely coupled to mounting bracket 612 and closure 617 is couplable adjacent each other when contiguous wrapping/connecting member 615 wraps inflatable curtain airbag 602.

Contiguous wrapping/connecting member 615 may be perforated to be more frangible, such that inflatable curtain airbag 602 may detach from the wrapping portion of contiguous wrapping/connecting member 615 upon deployment in a collision scenario. In other embodiments, contiguous wrapping/connecting member 615 may not be perforated, but rather a closure 617 is configured in such a manner that it predictably and consistently releases inflatable curtain airbag 602 during deployment. Such a closure may include hooks and loops, adhesive tape, glue, a clip, a snap, a staple or any other similar closure configured to open predictably and consistently in a manner favorable for inflatable curtain airbag 602 deployment.

Figure 7:
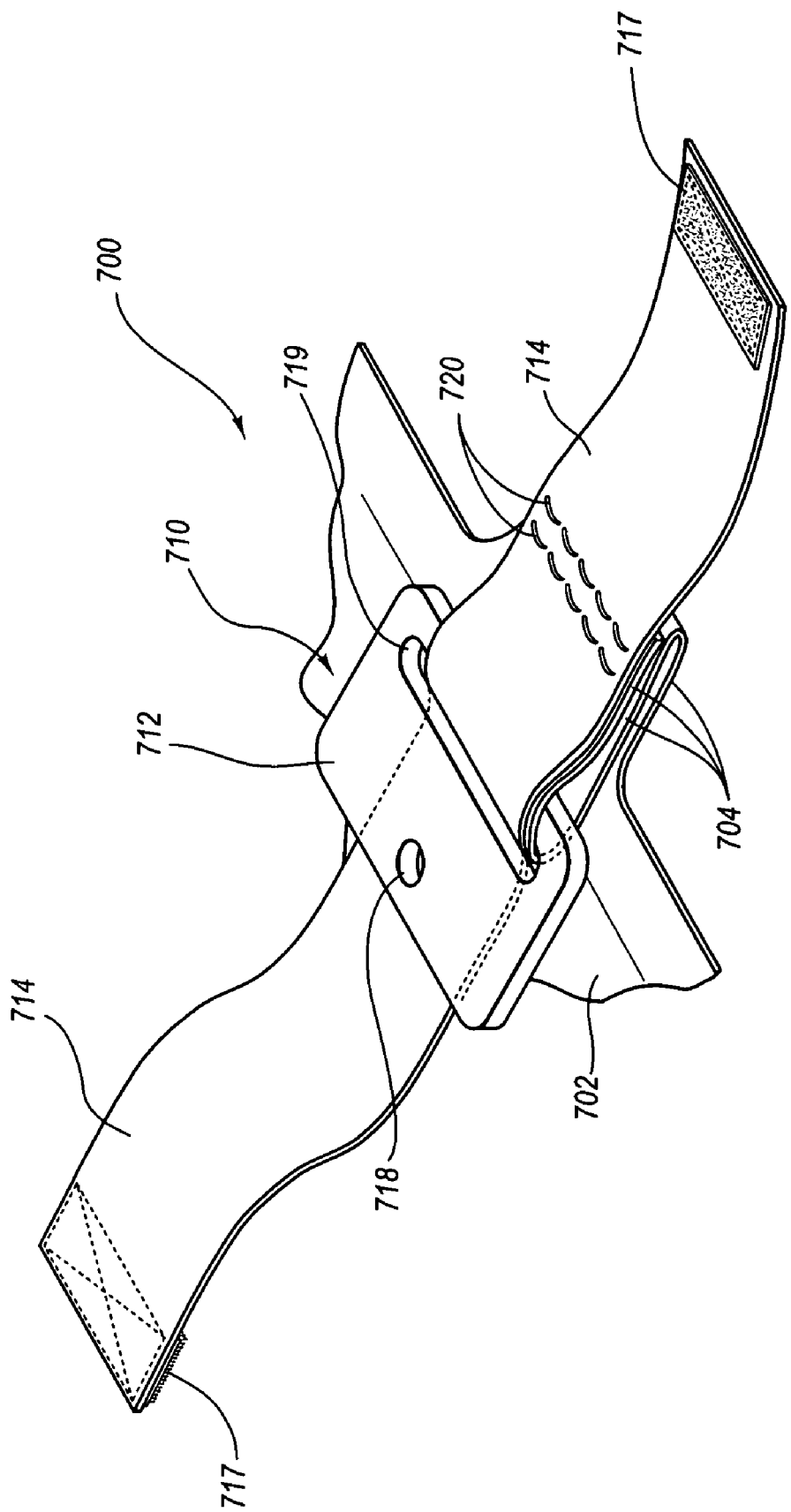
FIG. 7 is a perspective view of one embodiment of an airbag assembly in which the airbag mounting assembly is attached to an airbag that has been cut away and has not yet been configured into an undeployed conformation.

FIG. 7 depicts another alternative embodiment of an airbag assembly 700 from a perspective view. The airbag assembly of this embodiment comprises an inflatable curtain airbag 702 and an airbag mounting assembly 710. Airbag mounting assembly 710 may comprise a mounting bracket 712, a wrapping member 714, and an elongated attachment tab 704, which functions as a connecting member. Mounting bracket 712 may comprise a mounting aperture 718 and a receiving aperture 719. Wrapping member 714 may comprise a first end and a second end which may further comprise a closure 717.

Elongated attachment tab 704, may be a protrusion of airbag 702 or may be a separately attached tab. A portion of elongated attachment tab 704 acts as a connecting member and functionally replaces connecting member 116 as found in FIGS. 3, 4A, and 4B. Elongated attachment tab 704 is configured to be received by receiving aperture 719 in mounting bracket 712. Elongated attachment tab 704 may form a loop through mounting bracket 712 and is fastened back upon itself by a fastener, here depicted as stitching 720.

The inflatable curtain airbags, 102, 602, 702, disclosed herein are examples of means for cushioning an occupant of a vehicle during a collision event. The mounting brackets, 112, 612, 712, disclosed herein are examples of means for mounting the cushioning means to a structure within a vehicle. Furthermore, the connecting members 116, 615, 704, disclosed herein are examples of means for interconnecting the mounting means to the cushioning means. Moreover, the wrapping members, 114, 615, 714 disclosed herein are examples of means for wrapping a portion of the cushioning means in an undeployed state. Additionally fasteners 120, 620, 720 disclosed herein are examples of means for fastening the interconnecting means and the wrapping means adjacent to the mounting edge of the cushioning means.

Furthermore, the methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag mounting assembly, comprising:
   an inflatable curtain airbag;
   a mounting bracket including an aperture, the mounting bracket configured to be mounted to a vehicle structure;
   a connecting member extending through the aperture of the mounting bracket to interconnect the mounting bracket to the airbag; and
   a wrapping member extending through the aperture of the mounting bracket, wherein the wrapping member is wrapped around a portion of the airbag.

2. The airbag mounting assembly of claim 1, wherein the wrapping member comprises a frangible material configured to break upon deployment of the airbag.

3. The airbag mounting assembly of claim 2, wherein the frangible material is non-woven fabric.

4. The airbag mounting assembly of claim 2, wherein the frangible material is a plastic film.

5. The airbag mounting assembly of claim 2, wherein the frangible material is perforated fabric.

6. The airbag mounting assembly of claim 1, wherein the mounting bracket comprises a single planar metal member.

7. The airbag mounting assembly of claim 1, wherein the connecting member and the wrapping member are separate pieces of material.

8. The airbag mounting assembly of claim 1, wherein the wrapping member and connecting member comprise a contiguous piece of material.

9. The airbag mounting assembly of claim 8, wherein the wrapping member comprises a first end portion, a second end portion and an intermediate portion between the first and second end portions, such that the connecting member comprises a loop formed from the intermediate portion of the wrapping member.

10. The airbag mounting assembly of claim 1, wherein the wrapping member comprises a first end and a second end and a closure disposed on at least one of the first or second end, such that the first and second ends are couplable adjacent each other via the closure.

11. An airbag assembly, comprising:
   an inflatable curtain airbag including a mounting edge;
   a mounting bracket configured to be mounted adjacent a roof rail of a vehicle, wherein the mounting bracket comprises an elongated aperture;
   a connecting member interconnecting the mounting bracket and the inflatable curtain airbag;

a wrapping member coupled to the mounting bracket and wrapped around a portion of the inflatable curtain airbag in an undeployed state, wherein the wrapping member and the connecting member are received by the elongate aperture of the mounting bracket; and a plurality of stitches to secure the connecting member and the wrapping member to the inflatable curtain airbag adjacent its mounting edge.

12. The airbag assembly of claim 11, wherein the wrapping member comprises a frangible material configured to break upon deployment of the airbag and the connecting member comprises a non-frangible material resistant to breaking upon deployment of the airbag.

13. The airbag assembly of claim 11, wherein the inflatable curtain airbag comprises an attachment tab, the seam being located adjacent the attachment tab.

14. The airbag assembly of claim 13, wherein the attachment tab is an elongated fabric member and the connecting member comprises a portion of the attachment tab looped through an aperture in the mounting bracket.

15. The airbag assembly of claim 11, further comprising a plurality of mounting brackets, a plurality of connecting members and a plurality of wrapping members disposed along the mounting edge of the inflatable curtain airbag.

16. A method of assembling an inflatable curtain airbag assembly, comprising:

providing an inflatable curtain airbag having a mounting edge;

providing a mounting bracket with a connecting member coupled thereto, wherein the mounting bracket has an aperture;

placing the connecting member adjacent the mounting edge of the inflatable curtain airbag;

providing a wrapping member configured to wrap around the inflatable curtain airbag in an undeployed state, the wrapping member having a first end, a second end and an intermediate portion between the first and second ends;

passing the first or the second end of the wrapping member through the aperture of the mounting bracket;

placing the intermediate portion of the wrapping member adjacent the mounting edge of the inflatable curtain airbag; and fastening the connecting member and the wrapping member adjacent the mounting edge of the inflatable curtain airbag with stitching, such that the mounting bracket is coupled to the inflatable curtain airbag via the connecting member.

17. The method of claim 16, further comprising:

wrapping the wrapping member around the inflatable curtain airbag in an undeployed state.

18. The airbag mounting assembly of claim 1, wherein the connecting member is made from a woven material.

19. The airbag mounting assembly of claim 11, wherein the connecting member is made from a woven material.

* * * * *